(12) United States Patent
Shrinkle et al.

(10) Patent No.: US 7,672,073 B2
(45) Date of Patent: Mar. 2, 2010

(54) ITERATIVE REPEATABLE RUN-OUT NULLING FOR MAGNETIC HEAD TESTER

(75) Inventors: Lou Shrinkle, Leucadia, CA (US); Peter Crill, Encinitas, CA (US); Matthew Yee, Milpitas, CA (US); David Hu, Los Altos, CA (US)

(73) Assignee: Headway Technologies, Inc., Milpitas, CA (US)

( * ) Notice: Subject to any disclaimer, the term of this patent is extended or adjusted under 35 U.S.C. 154(b) by 69 days.

(21) Appl. No.: 12/070,285

(22) Filed: Feb. 14, 2008

(65) Prior Publication Data

US 2009/0207516 A1    Aug. 20, 2009

(51) Int. Cl.
G11B 27/36     (2006.01)
G11B 5/596     (2006.01)

(52) U.S. Cl. .................. 360/31; 360/77.04; 360/77.08; 360/78.04

(58) Field of Classification Search ........................ None
See application file for complete search history.

(56) References Cited

U.S. PATENT DOCUMENTS

| | | | |
|---|---|---|---|
| 6,952,320 B1 | 10/2005 | Pollock et al. | |
| 6,999,267 B1 | 2/2006 | Melkote et al. | |
| 2002/0018314 A1 | 2/2002 | Takano et al. | |
| 2003/0058570 A1* | 3/2003 | Min et al. | 360/77.04 |
| 2003/0112545 A1 | 6/2003 | Hanson et al. | |
| 2005/0237645 A1 | 10/2005 | Ehrlich | |
| 2007/0047124 A1 | 3/2007 | Shrinkle et al. | |

* cited by examiner

*Primary Examiner*—Andrew L Sniezek
(74) *Attorney, Agent, or Firm*—Saile Ackerman LLC; Stephen B. Ackerman

(57) ABSTRACT

A method for operating a head testing apparatus or, more generally, a host hard disk drive using a mounted hard disk that has had its servo track information pre-written in an external servo-writing apparatus rather than in the head testing or host apparatus itself. The method eliminates repeatable errors and repeatable runout by effectively replacing the pre-written servo tracks, which are eccentric, with new track profiles that are tracked like circular tracks. The problem of repeatable errors is caused by repeatable runout superimposed upon written-in position errors when a disk written in one machine is transferred to another. This problem is eliminated by forming IRON (Iterative Repeatable Runout Nulling) profile tracks from the initially pre-written servo tracks, where the IRON profile tracks are effectively tracked as concentric circular tracks and generate no PES. The IRON profile is formed by an iterative method that starts with the measurement of the PES of one of the pre-written tracks and iteratively forms a new track profile that is effectively circular.

8 Claims, 3 Drawing Sheets

ITERATIVE REPEATABLE RUN-OUT NULLING FOR MAGNETIC HEAD TESTER

RELATED PATENT APPLICATIONS

This Application is related to Ser. No. 11/217,872, Filing Date Sep. 1, 2005, assigned to the same Applicant as the present Application.

BACKGROUND OF THE INVENTION

1. Field of the Invention

This invention relates generally to a device for testing magnetic read/write heads and more specifically to such a device in which there is a rotating magnetic disk on which servo information has been written.

2. Description of the Related Art

Before their installation in a conventional direct access storage device (DASD), magnetic read/write heads are first tested in a device specifically designed for the testing process. A magnetic head tester is basically a rudimentary disk drive that includes a drive motor and spindle (called a spin stand), at least one magnetic disk mounted on the drive motor spindle and capable of being rotated thereby, an actuator on which the head to be tested is mounted and an electromechanical system, called a servomechanism (or, equivalently, a servo-control mechanism), for accurately positioning the actuator (and its mounted head) relative to the rotating disk. The testing device also includes a micro-positioner and associated circuitry for writing servo-tracks, to be discussed below, on the magnetic disk, so that the head can be accurately positioned at target locations on the disk.

In order to test the read and/or write capabilities of a head, it is necessary to accurately position the head at various places on a disk mounted within the tester. To insure the accuracy of this positioning process, the disk mounted within the tester is furnished with embedded information, called servo information, which is data stored (as "bursts" of magnetic transitions) within sectors of small angular width that are periodically distributed along radially narrow, concentric, annular circular tracks on the disk. This servo information, which, in the prior art, is written on the disk while the disk is already mounted in the tester, is written using a micro-positioner affixed within the tester and the head already mounted in the tester. The micro-positioner is a device that can incrementally move the head to proper positions at which to write the servo information.

The servo information identifies radial positions within the annular width of the tracks, so that the track center can be accurately located and it also identifies the angular positions of data-free sectors within the tracks, typically adjacent to the sectors containing the servo information, on which data can subsequently be written and read by the head during the testing process. The role of the servo data is of great importance in accurately positioning the head relative to the center of the track and in maintaining that position during portions of the testing process. Thus, servo data supplies both track identifying information and positioning information When the actuator mounted head seeks a particular position on the disk (the target position), which is typically the radial center of a track at some angular position along the track, the servo information located adjacent to that position is read by the head being tested and used to determine whether the head is actually located where it is supposed to be. This servo information is read immediately before the head reaches the target position and is transmitted to what is called servo-loop circuitry that is an integral part of the servomechanism of the tester. The difference (if it exists) between the intended location of the actuator (the target) and the actual location of the actuator as indicated by the adjacent servo data, generates a position error signal (PES) that is then used to correct the actuator positioning on the track. The PES, which is digital data, is supplied to a digital-to-analog converter (DAC) that generates a current proportional to the digital PES and, in turn, activates a voice coil motor (VCM), which is a current carrying coil positioned between permanent magnets. The VCM then responds to the DAC generated current and repositions the actuator.

There are many reasons why the actuator may be positioned incorrectly. Random vibrations can easily move the head slightly from its target, but much of the position error is related to the fact that the typical magnetic disk is slightly warped or generally fails to rotate perfectly on its spindle. Thus, even if the actuator is locked at what should be the fixed radial position of the target track's center line, the projection of the head on the rotating disk is not a circle concentric with the disk center, whereupon the head fails to follow the target track's center line and may, in fact, overlap several tracks.

The servo data, because of the process with which it is written, is presumably located on tracks that are essentially concentric circles of small radial width (circular annuli). Therefore, when the disk rotates improperly, there is a discrepancy between the track followed by the actuator (and mounted head) and a circular track produced by the servo data writing process. Nevertheless, the embedded servo data is supposed to rectify the improper tracking by means of the provided PES.

Writing accurate servo data on the disk is an important, expensive and time consuming task that is done within the head tester itself using an open-loop or closed-loop micro-positioner and the tester's head.

The additional elements within the tester needed to write servo data, including the micro-positioner and its associated circuitry, add greatly to the expense of the tester. In addition, the use of these additional elements, as noted, adds to the time required to complete the testing process. Even with the added time and expense, however, the repeatability of the servo pattern on a plurality of disks is often questionable and it is difficult to verify pattern accuracy. This is because the head testing device is not an optimal device within which to write servo data.

Takano et al. (US Patent Application Publication: US 2002/0018314 A1) describes a magnetic-disk evaluation apparatus in which servo information is both written on a disk and tested for its accuracy. In such a disk-evaluation process, servo information is first written on the disk in a temporary form, often by simply copying it from another disk. If this servo information is of sufficient accuracy, the disk can be tested for compliance with certain industry standards and, if those standards are met, the disk is then mounted within its final hard disk drive where more accurate servo information is written upon it. A problem arises if the temporary information is of insufficient accuracy to permit the disk to be mounted for writing of the permanent information. Takano et al. therefore provide a system in which the temporary servo signals can be evaluated using a measuring device and positioner to determine whether the arm of the evaluation apparatus is displaced from a target position by an unacceptable amount.

The present inventors, therefore, proposed the use of a disk in a head testing apparatus in which embedded servo data has been pre-written outside the testing apparatus within a dedicated servo disk writer. This invention constitutes related patent application, Ser. No. 11/217,872, that is hereby incorporated in its entirety by reference.

The sole task of a dedicated servo disk writer is to efficiently, accurately and repeatedly write servo information on disks. Such a device can do the job with much greater accuracy and repeatability than can be accomplished using a head tester with an included micro-positioner as a servo track writer. Moreover, by allocating the task of servo track writing to a device that is designed specifically to perform such a task, the necessity of using the head tester to perform the same task in a less exact, repeatable and efficient manner, is eliminated. Thus, the head tester can be simplified and dedicated to doing what it is meant to do, namely to test heads.

A problem arises, however, when a disk that has its servo tracks written in one apparatus is then transferred to another. The problem is a result of the fact that although servo data is written on circular tracks that are substantially concentric when originally written on the disk, these tracks will generally be eccentric when the disk is rotated by the drive spindle of the apparatus to which it is transferred (the host apparatus). This, of course, will be the inevitable result if the drive spindle of the original servo writer has even the slightest wobble or if the disk itself slips, is warped or off-center, or if the writing apparatus was subjected to thermal or mechanical shocks during the writing process or if the host apparatus has similar problems. Given that present 3.5" disks have a track pitch of approximately 100,000 tracks per inch (TPI), it can be seen that the radial width of each track is miniscule and that the slightest variations in track concentricity will be exacerbated by variability between machines or external perturbations. Thus, if a dedicated servo writer is to be used to write the servo information on a disk that is then mounted in a head tester, the head tester must have the ability to either eliminate or compensate for the eccentricities of the pre-written servo data.

The lack of track concentricity and other written-in positioning errors encountered by a head testing device attempting to read what were supposed to be concentric circular tracks when they were originally written, become what are called repeatable position errors. Even if the original tracks were perfectly concentric circles, but their concentricity is lost in the host tester, then new writes by the read/write head, even if the head is kept at a substantially fixed radial position, can cross over several tracks and can overwrite previously written data. This phenomenon is called repeatable runout (RRO). It is to be noted that the RRO problem is not restricted to head testing devices, but is also a common problem in the disk drives of actual DASD's themselves. Some key sources of repeatable position errors (including RRO) in following a servo track are the following:

1) RRO due to shift in center of rotation, before and after servo-track write (already discussed above).
2) Uneven track spacing written by the servo track writer.
3) Repeatable error due to position error written-in by the servo track writer.
4) Vibration induced RRO.
5) "Apparent" position error due to media noise, media variations and defects.

Wherever such errors occur, accurate positioning of the read/write head becomes nearly impossible without additional information being present to guide the head to the correct track positions and, when possible, to correct for RRO in some systematic way. This additional information, which is then used to actuate the locating and position-correcting servo-mechanisms within the host drive unit, is the servo information already contained within the tracks themselves.

Along with the RRO type of position error that is associated with off-center drive spindles, as in 1) above, or warped disks, there is the more difficult problem of position errors associated with random mechanical, electrical and thermal perturbations of the drive system and/or disk as included under 4) and 5) above. When such random errors in the pre-written disk are carried over onto a host drive, they show up as repeatable errors. In turn, these repeatable errors cause the servomechanism of the host drive to constantly respond, in an effort to provide a position correction. The associated accelerations of the actuator causes undesirable effects such as uneven track spacing, track encroachment and inconsistent measurements.

In general, the servo data embedded in the disk provides enough information to fully characterize the effects of repeatable position errors and, therefore, it provides enough information to eliminate or significantly suppress those effects. The invention Ser. No. 11/217,872 cited above and incorporated herein by reference specifically addressed the problem of eliminating the effects of RRO in 1), namely RRO caused by an off-center spindle in a disk servo-written on a dedicated servo-track writer. It will be an object of the present invention to address the problem of eliminating other effects of RRO, such as those in 2-5, once the effects of drive spindle eccentricity RRO have been eliminated.

Prior art discloses various attempts to eliminate the effects of RRO. Melkote et al. (U.S. Pat. No. 6,999,267) disclose a method for determining the PES for each servo sector, to be used in iteratively determining proper compensation for RRO.

Ehrlich (US Published Patent Application 2005/0237645) addresses the misplacement of the head while writing. This problem is resolved by adjusting the width of the servo burst in order to place the servo burst in a correct position to properly locate the head.

Hanson et al. (US Published Patent Application 2003/0112545) teaches computing a coherent RRO by averaging PES over multiple tracks so as to produce a zero acceleration profile.

Unlike the cited prior art, the present invention describes a method to measure and compute the complete written-in position error (errors 1-5 above) so as to provide a reference profile for subsequent track following operations that allows the error to be effectively eliminated as is made evident by a position error signal (PES) of essentially zero amplitude (see FIG. 4). The new track profile now being followed, with the effective elimination of the center-line eccentricities, will be called an "Iterative Repeatable Runout Nulling Profile" or an IRON Profile, since the actuator arm treats the center line as a null position and the head moves only relative to that position with nearly zero acceleration during track following operations.

SUMMARY OF THE INVENTION

It is a first object of this invention to make the writing of servo track data on disks used for testing read/write heads a more accurate, reproducible and efficient process and, thereby, to make the head testing process itself a more accurate, reproducible and efficient process.

It is a second object of this invention to achieve the first object without sacrificing the capability of that servo data to enable the accurate location of data tracks during the normal operation of the head testing device.

It is a third object of this invention to provide a method of eliminating the continual servomechanism corrections of repeatable runout (RRO) and other repeatable errors associated with a rotating disk mounted within a host head testing device when said disk has had its servo data written in a different device.

It is a fourth object of this invention to provide a method of eliminating the continual servomechanism corrections of repeatable runout (RRO) and related repeatable errors associated with a rotating disk mounted within a host head testing device when said disk has had its servo data written in a different device and when such servo data is further characterized by written-in position errors.

It is a fifth object of the present invention to improve servo accuracy in a head testing device by minimizing track following error and head acceleration associated with attempts by the head to follow an eccentric path.

It is a sixth object of the present invention to eliminate problems with mechanical hysteresis and resonance that occur when an actuator-mounted head requires rapid movements to follow track eccentricities that include the effects of repeatable runout and repeatable errors.

It is a seventh object of the present invention to eliminate uneven track spacing resulting from undesired position corrections and associated accelerations produced by a servomechanism responding to repeatable runout.

It is a eighth object of the present invention to provide a less costly head testing device by eliminating the need for servo-writing components such as micro-positioners within the device itself.

The objects of the present invention are achieved by introducing a disk or a plurality of disks, each pre-written with servo data on a plurality of tracks, into a head testing device (referred to herein as a "host drive") and thereby eliminating the need for a servo data writing apparatus within the tester itself. The servo data is written onto the disk (or disks) using a dedicated servo writing apparatus, which, thereby, improves the quality of the servo tracks and, therefore, the accuracy, repeatability and efficiency of the head testing process. As a result, the servo-writing elements contained within the dedicated writer will no longer need to be made a part of the head tester, thereby significantly reducing the cost of the head tester as well as reducing the time required to complete the head testing process. The effects of repeatable position errors associated with the use of pre-written disks on a host drive are then effectively removed from the position error signal (PES) generated by the servomechanism within the host drive, so that these errors are effectively ignored, or nulled. The tracks defined by these nulled PES's are denoted IRON profile tracks. Thus, in all subsequent track following operations (i.e., reading and writing operations), the actuator-mounted head follows and IRON profile track and behaves as though it is following a circular path. Moreover, the method can be used to define a band of adjacent IRON profile tracks, the annular width of the band being sufficient for the testing purposes for which the disk is being used.

The mechanism by which the repeatable errors are nulled by the host drive's servo-mechanism is by first measuring an initial time averaged PES for a given track and then calculating and storing a new PES by use of an iterative method, "Iterative Repeatable Run Out Nulling" (the IRON profile discussed above). This new PES is then used to effectively define a new reference profile for track-following by the head, the IRON profile. When the head follows this IRON profile, whose method of formation is to be described below, it is essentially following a concentric circular track. Therefore, its motion is essentially free of the accelerations that would have been caused if the head were responding to a non-nulled PES generated by the servomechanism as the head attempted to follow the as-written track with its repeatable position errors.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein.

DESCRIPTION OF THE PREFERRED EMBODIMENT

The present invention teaches a method of operating a magnetic read/write head testing apparatus (commonly referred to as a "spin stand") using disks on which servo track information has been externally pre-written in a dedicated servo track writer. The head testing apparatus, (also denoted a "host drive" in the following), therefore, lacks the servo-writing mechanisms that, in any event, operate with better accuracy and repeatability when a part of the dedicated servo-writer. The method can be applied even more generally to the use of pre-written disks in any host drive. The problem of repeatable position errors (including RRO) that inevitably arises when a disk written on one drive is then transferred to a host drive is eliminated by calculating an IRON profile that nullifies the tracking error caused by the repeatable position error. This new profile is calculated from an initial PES by an iterative method (IRON) that is then used to produce a new reference tracking profile (the IRON profile) which the head now follows and along which the head experiences virtually zero acceleration during its track-following operations. As a result of the ability of the head to now follow this new profile with virtually no PES induced accelerations, there is also more consistent track spacing.

Figure 1:
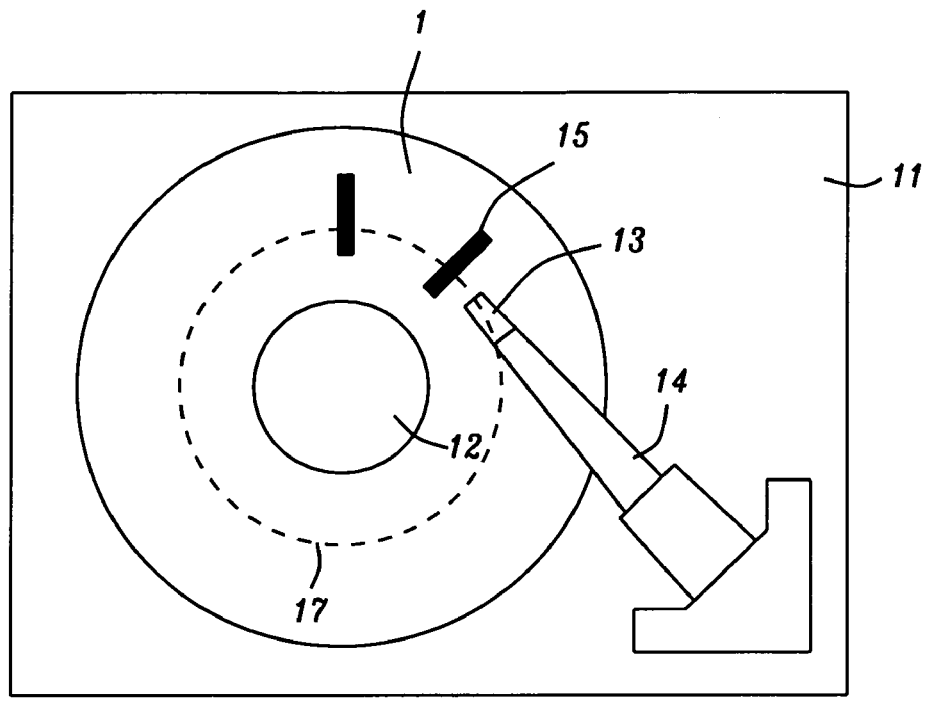
FIG. 1 shows a schematic illustration of a head testing apparatus (spin stand) that does not include a servo-writing mechanism and that therefore fulfills the object of the present invention.

Referring first to FIG. 1, there is shown a schematic illustration of a host drive that is a head testing apparatus (spin stand) that does not include a servo track writing apparatus such as a micro-positioner. In accord with the present invention, such servo track writing apparatus is not required in the head tester because the magnetic disk to be mounted therein is already pre-written with the necessary servo information through the use of an external servo track writing apparatus (not shown). FIG. 1 schematically shows such a typical head testing apparatus. The host drive in this embodiment includes a base (11) that supports a spindle motor (12). A disk (1) is mounted on the spindle motor and can be made to rotate at an arbitrary speed by the motor. In accord with the present invention, the disk (1) will be the pre-written disk shown in FIG. 2 and described below, on which servo information has already been written in a dedicated servo track writer. It is understood that the pre-written tracks on the disk are substantially concentric circular tracks, although not perfectly so and that they may generally contain random written-in position errors. An actuator (14), adjacent to the spindle, supports the head to be tested (13). An electromechanical servomechanism (not shown) corrects the position of the actuator with a position error signal (PES). The PES places the actuator correctly along an annular circular track (17), shown as a dashed circle, based on the reading of servo data that has been embedded in servo sectors (15) (only two such sectors being shown schematically as radially extending darkened rectangles) on the disk surface (also shown in FIG. 2) that intersect the track. Such correction by the PES is necessary because, for a variety of reasons as discussed, the hard disk does not maintain a constant center of rotation during operation of the host drive. The properties of such a servo-mechanism are well known in the art and, for the purposes of the description of this preferred embodiment it is sufficient to note that the servo-mechanism can operate within a range of bandwidths, related to the quantity of servo information that is extracted from the disk and used to correct the position of the actuator. The servo-mechanism (not shown) includes a digital-to-analog converter (DAC) that produces a current proportional to the digital position error signal (PES). The PES is the difference between the target position to which the head has been sent (typically the radial center line of the target track) and the position as indicated by the servo-data read by the head (typically not the target track center line), which is embedded within the servo sector immediately beneath the head. This difference is also referred to herein as the position offset. The DAC current thereupon activates a voice coil motor (VCM) that moves the actuator so as to eliminate the positioning error. It is noted that the PES contains the effects of the repeatable position errors discussed above as errors 1-5. The servo-mechanism also includes a random access memory (RAM) in which data can be stored and in which the PES can be stored.

Figure 2:
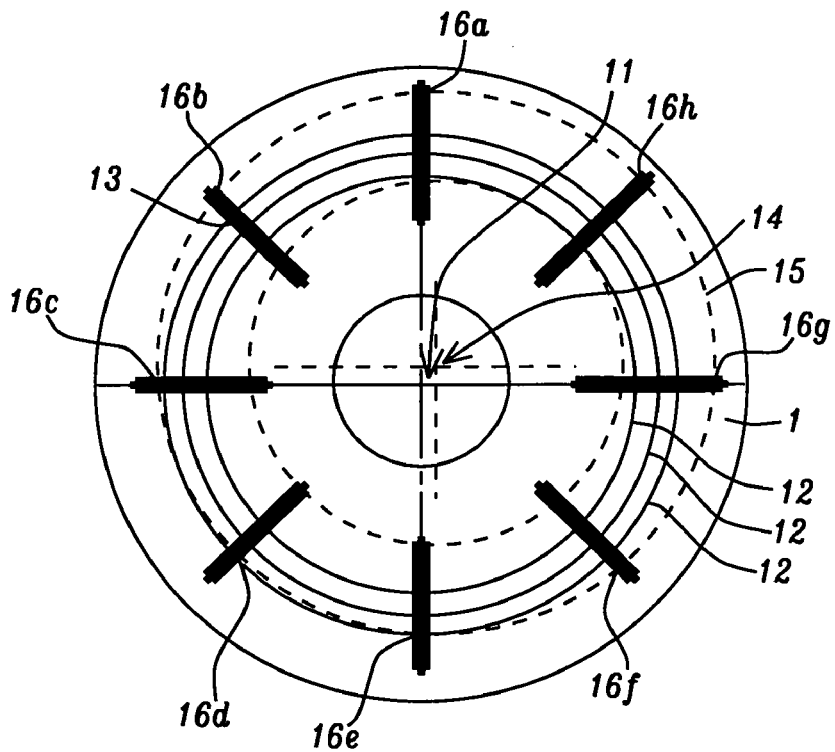
FIG. 2 shows in schematic form an overhead view of a typical externally servo-written disk that would be mounted in the head testing apparatus of FIG. 1 in accord with the method of this invention.

Referring now to FIG. 2, there is shown an exaggerated schematic illustration of a disk (1), such as that mounted in the host drive of FIG. 1, on which the servo track data has been externally written in accord with the present invention. The center of rotation of the disk when it was mounted in the servo track writer is indicated as (11). The center of rotation of the disk as mounted in the host drive of FIG. I is indicated as (14). Differences in the location of these centers of rotation are at least partially responsible for the presence of repeatable position errors in the disk when it is operated in the host drive. Even if the pre-written servo track was perfectly circular, annular and concentric with the original spindle, the track would wobble eccentrically when place on the host drive spin stand. This problem is exacerbated when the originally written track also has written-in position errors and other perturbations resulting from imperfections of the servo track-writing operation within the dedicated track writer. Then, the transferred disk exhibits repeatable position errors of an exceedingly complex form. The method of this invention will analyze these complex repeatable position errors and eliminate them from the PES Eight pre-written servo sectors (13) are shown schematically as darkened, radially extending line segments. The thickness of the line segments is a schematic indication of the angular width of these sectors. In a real disk, there would be many more such sectors. These sectors effectively define the positions of the tracks (12) and contain various types of servo data for each of them. These tracks were substantially circular and concentric when written in the external servo-track writer and are indicated as such. Several dashed lines (15) represent circular paths that would be followed by the host drive head if the head were set at a fixed radial position while the disk rotated about its center of rotation (14) with the spindle in the host drive. As can be seen, each of these tracks (15) is eccentric relative to the externally written tracks (12) and one track is shown intersecting the servo sectors at different radial positions (16a-f). This radially variable set of intersections is one way of schematically indicating the repeatable runout (RRO) portion of the originally concentric tracks when the disk is mounted in a different machine. Conversely, if the head is made to follow a given track location as specified by the embedded servo data, the head will move in and out radially and register a position error signal. If the actuator tries to track the repeatable position errors of the original servo track, which a servomechanism operating at full bandwidth can allow it to do, the actuator will be in a constant state of accelerated motion, which is undesirable. This state of accelerated motion is indicated by the response of the PES as the actuator attempts to follow the target track.

Figure 3:
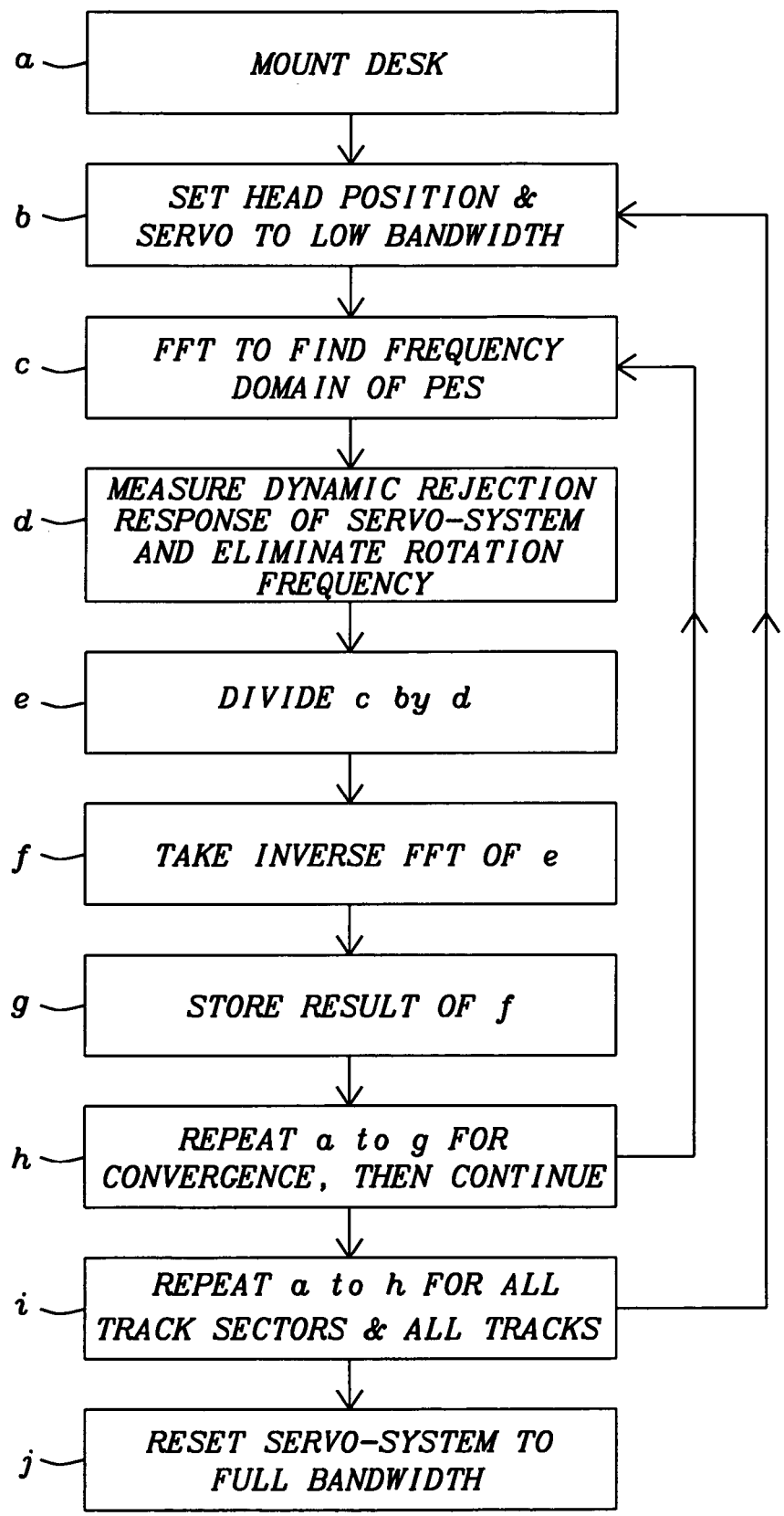
FIG. 3 is a flow chart illustrating the sequence of steps required to achieve the objects of the invention.

FIG. 3 is a flow chart illustrating the sequence of steps that implement the process of the present invention. These steps will allow the information already embedded in the externally written servo-tracks on the disk to be used to nullify (eliminate) the continuous tracking by the actuator of the repeatable position errors associated with the written-in servo track position errors as reflected in the eccentric and otherwise perturbed tracks in the head tester. The nullification of the repeatable errors enables the host drive to effectively track concentric circular tracks rather than the eccentric and perturbed servo tracks pre-written on the disk. Together with each of the flow chart steps is an explanation of their effects within the method. After the application of the steps of the flow chart, a chosen number of adjacent servo tracks will have been given an IRON profile so that the head in the host drive is effectively following a circular path with greatly reduced excursions from concentricity and correspondingly reduced head accelerations. In addition, by applying the steps of the flow chart to a plurality of adjacent tracks written in the dedicated track writer, a corresponding plurality of effectively concentric, adjacent, circular IRON profile tracks are created within the operation of the host head testing apparatus. The flow chart steps are as follows.

(a): MOUNT DISK IN HOST DRIVE. The pre-written disk is mounted on the spindle of the head testing apparatus of FIG. 1.

(b): SET HEAD TO FOLLOW A CHOSEN TRACK, SET SERVOMECHANISM TO A LOW BANDWIDTH CONDITION AND MEASURE A TIME AVERAGED PES. The head within the testing device is made to follow a selected track on the disk. The servomechanism is set to a low bandwidth condition, so that the head is maintained in a relatively stable stationary state and exhibits minimal movement relative to the fixed setting. The head is thereby able to take repeated samples of the position error signal for each servo sector along the chosen track and to average those samples over many rotations. The results enable a time domain PES to be obtained (see FIG. 4) for the positional variations of the head along the selected track.

(c): USE FAST FOURIER TRANSFORM (FFT) OF THE TIME DOMAIN PES PROFILE TO FIND THE FREQUENCY DOMAIN PROFILE OF THE PES AND THEN REMOVE THE FUNDAMENTAL ROTATION FREQUENCY. The signal has a period corresponding to the rotation frequency of the host drive. This period should be removed from the frequency domain profile. By working in the frequency domain rather than the time domain much of the mathematical manipulation is simplified.

(d): MEASURE THE DYNAMIC REJECTION RESPONSE OF THE COMPLETE SERVO SYSTEM, INCLUDING HEAD, MECHANICS AND SERVO ACTUATION SYSTEM. This will enable the effects of the servo system to be eliminated. Remember, the purpose of the invention is to locate the actual motion of the eccentric track without the inclusion of the effects of the servo-mechanism's attempts to compensate for these eccentricities. The required rejection response of the servo system can be obtained using a Bode plot in the frequency domain at the rotational frequency and its harmonics. The use of such plots to obtain a relationship between the output and input of a complex system is well known in the art.

(e): CALCULATE ACTUAL PES INPUT FREQUENCY DOMAIN PROFILE BY DIVIDING THE FREQUENCY DOMAIN PROFILE OF THE PES BY THE DYNAMIC REJECTION RESPONSE OF THE SYSTEM IN (d). Division by the dynamic rejection response in the frequency domain will correspond to elimination of the dynamic rejection response in the time domain. The use of the frequency domain for these calculations is an appreciable simplification.

(f): USE INVERSE FFT ON THE INPUT PES FREQUENCY DOMAIN PROFILE TO FIND THE ACTUAL INPUT PES SEQUENCE IN THE TIME DOMAIN. Back transforming the cleansed PES profile as in (e), gives the cleansed time domain profile of the PES, which is the object of the method.

(g): STORE THE TIME DOMAIN PES PROFILE AND USE AS A REFERENCE FOR THE SERVO MECHANISM. The PES profile can be stored in a RAM location for easy access during servo operation. This PES profile is then used as a reference by the servo-mechanism for track following.

(h): REPEAT (c)-(h) TO CONVERGE TO A MINIMUM RMS (Root Mean Square) ERROR IRON PROFILE, THEN CONTINUE. With each successive iteration, the new PES profile is stored and used as a reference PES in (c) and the entire process continues to (h). When the minimum rms error is reached, the process continues on to step (i).

(i): REPEAT (b)-(h) FOR MORE TRACK SECTORS IF DESIRED AND FOR ADDITIONAL TRACKS IF DESIRED. The process can be used to sample the position offsets of any number of servo sectors, between a single such sector and the maximum number of such sectors formed using the dedicated servo track writer. If adjacent tracks are to be processed in the same manner, the method can be bootstrapped, in that the final IRON result for the previous track can be used as an initial approximation to null the offsets for the current track. This method improves convergence and reduces calculation times. At the completion of the process set forth in (b)-(i) above, the head will follow the center of each IRON track as though it is a circular track, in that the head will deviate with only extremely small deviations from the track as established by the calculated PES signal.

(j) RESET SERVO-SYSTEM TO FULL BANDWIDTH

The method described by steps (a)-(j) above can be augmented to provide additional advantages to the use of the pre-written disk. It is known that the separation of the read and write heads resulting from their relative placement within a slider implies that these two heads access portions of a disk track that are offset from each other. Thus, accurately locating a track position by means of the read head locating a particular servo-sector, does not mean that the write head is writing its data at that precise location. The above method can be used to compensate for the read/write offset by including a small DC term in the calculated PES that makes the read head seek a portion of the track that is annularly displaced from its center line. In the same manner, a DC term can be included within a given calculated PES signal so that the signal that includes the DC term defines an adjacent IRON profile track that is a uniform radial distance from the given track. In this way, the method can be used to provide uniformly spaced, concentric servo-tracks on the disk.

Figure 4:
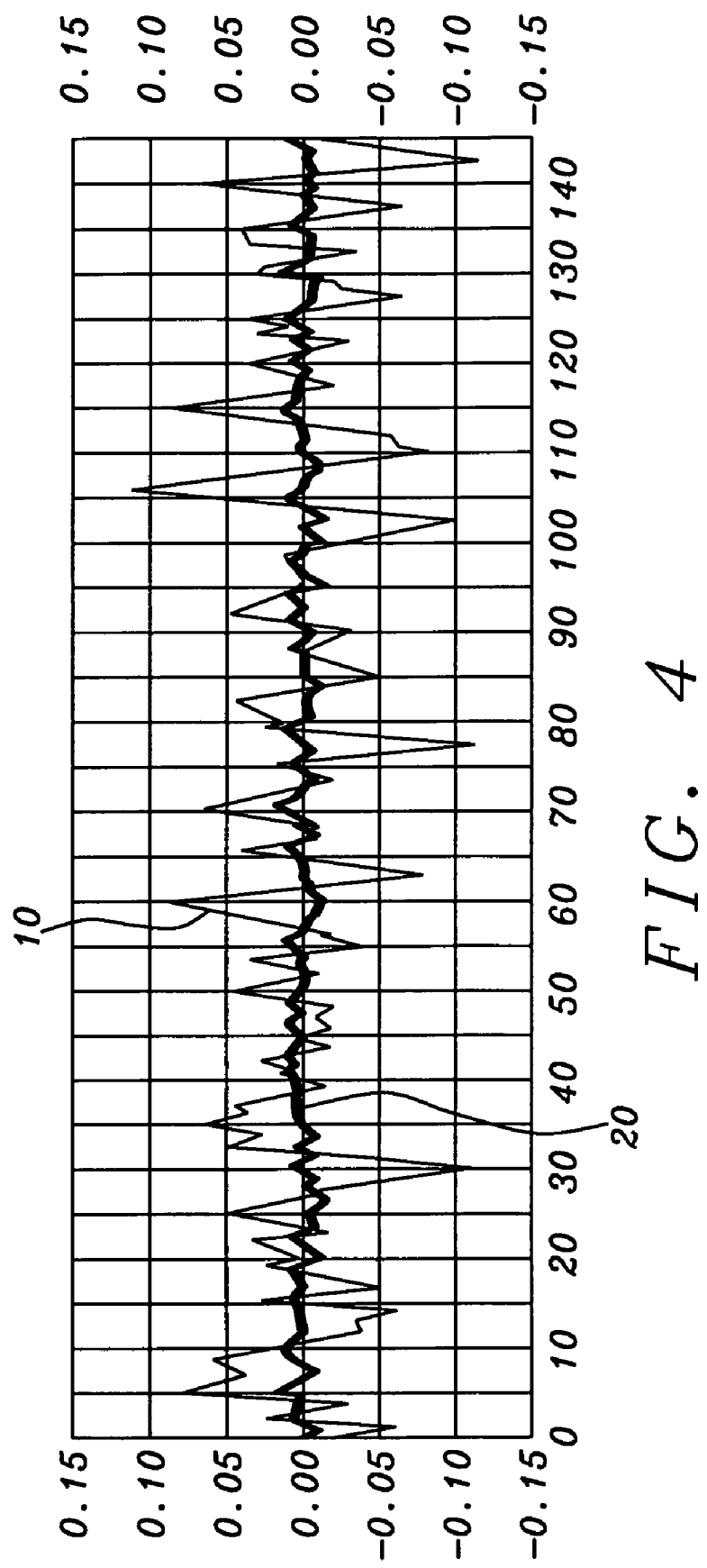
FIG. 4 is a graphical display of the time-averaged PES of a single track as measured in a typical head testing or host drive mechanism before and after the use of the method of the present invention to calculate an IRON profile that nulls the repeatable errors.

Referring to FIG. 4, there is shown a graphical output of a typical time averaged PES, both before (10) and after (20) the use of IRON to create a track profile to be servo followed with a minimum rms error. The graphs in both cases are created by averaging over several hundred rotations of the disk at 142 separate servo sectors (horizontal axis) on a single track. The amount by which the graph (20) is reduced in its amplitude (vertical axis) is an indication of the degree to which the track following process by the head being tested produces smaller deviations from a given track position and, therefore, correspondingly smaller accelerated motions by the head as it follows a track.

As is finally understood by a person skilled in the art, the preferred embodiment of the present invention is illustrative of the present invention rather than limiting of the present invention. Revisions and modifications may be made to methods, constructs, materials, structures and dimensions by which a head testing apparatus or host hard disk drive is operated with the nullification of repeatable errors while using magnetic hard disks on which servo information has been pre-written off the drive spindle of the tester or host drive, while still providing such head tester or host drive operation in accord with the present invention as provided by the appended claims.

What is claimed is:

1. A method for operating a magnetic head tester or host hard disk drive using magnetic hard disks on which servo information has been pre-written, comprising:

providing a magnetic head tester or host hard disk drive, either device including a motor driven rotating spindle on which a magnetic hard disk is to be mounted, a movable head actuator assembly, a slider encapsulated read/write head to be tested that is affixed to said head actuator assembly and is positioned at selected target locations on said disk by the movement of said actuator assembly and reads information stored within servo sectors thereat, and an electro-mechanical servo-control system, operable at various bandwidths, for responding to a stored position error signal (PES) that is storable within a data storage mechanism within said devices and of thereby controllably positioning said head at said target locations;

mounting on said spindle a magnetic hard disk on which has already been pre-written, in an external apparatus, a plurality of concentric circular tracks, wherein each said track contain regularly spaced servo sectors, said servo sectors including embedded information defining radial and angular positions within each said track and wherein each said track is further characterized by written-in position errors and wherein said written-in position errors and repeatable runout produce repeatable position errors in each said track and generate corresponding first position error signals for each said track when said hard disk is operated in said head tester or said host hard disk drive; then nullifying said repeatable position errors by iteratively forming from each of said plurality of concentric circular tracks an IRON (Iterative Repeatable Run-Out Nulling) profile track wherein each said IRON profile track is characterized by a second position error signal that has a substantially zero magnitude whereby there is significantly reduced head acceleration during track-seeking, track-following and read/write operations along said IRON profile track and along which said IRON profile track the head effectively follows a circular track and wherein said IRON profile track is formed by a method comprising:

(a) setting the servomechanism to a low bandwidth condition and locating a first concentric circular track;
(b) measuring the initial time average PES profile in the time domain by averaging the PES at servo sectors located along the track location;
(c) using a FFT (Fast Fourier Transform), finding the frequency domain profile of the PES measured in (b), then removing its fundamental rotation frequency;
(d) measuring the dynamic rejection response of the complete servo system, including the head, the electro-mechanical components and the servo actuating system;
(e) calculating the actual input PES freciuency domain profile by eliminating the dynamic rejection response measured in (d);
(f) using an inverse FFT on the actual input PES frequency domain of (e), finding the actual time domain profile of the input PES time sequence;
(g) using the profile obtained in (f) as the profile in (b), repeating steps (b) to (g) until an acceptable degree of rms (root mean square) accuracy for said PES time domain profile is obtained; then
(h) using the resulting PES time domain profile of (g) as a reference profile to define said IRON profile track.

2. The method of claim 1 wherein a second IRON (Iterative Repeatable Run-Out Nulling) profile track is efficiently formed adjacent to said first IRON profile track by locating a second concentric circular track adjacent to said first concentric circular track and using the PES reference profile of said first IRON profile track as the time average PES profile in step (b) and progressing to step (h).

3. The method of claim 2 wherein a time domain PES profile of each of the plurality of servo tracks on said hard disk is obtained in succession, using as initial approximations thereto the time domain PES profile of an immediately adjacent track.

4. The method of claim 1 wherein the input PES signal in the frequency domain is provided with a DC component that compensates for a positional offset of the write head of said slider encapsulated read/write head relative to the read head of said slider encapsulated read/write head.

5. The method of claim 1 wherein a second track is formed adjacent to and uniformly separated from said first track by including a DC term in the calculated PES in the frequency domain of said first track.

6. The method of claim 1 wherein the fundamental rotational frequency of said measured PES time domain sequence is removed by dividing the frequency domain sequence of said PES signal by said fundamental frequency.

7. The method of claim 1 wherein the dynamic rejection response of the complete servo system is eliminated from said PES by dividing the measured frequency domain profile in (c) by the dynamic rejection response of (d).

8. The method of claim 1 wherein the dynamic rejection response of said servomechanism is found by using a Bode plot in the frequency domain to relate the input and output of said servomechanism.

\* \* \* \* \*